United States Patent [19]

Kobayashi

[11] Patent Number: 5,530,801
[45] Date of Patent: Jun. 25, 1996

[54] DATA STORING APPARATUS AND METHOD FOR A DATA PROCESSING SYSTEM

[75] Inventor: Nobuo Kobayashi, Kawasaki, Japan

[73] Assignee: Fujitsu Limited, Kawasaki, Japan

[21] Appl. No.: 281,156

[22] Filed: Jul. 27, 1994

Related U.S. Application Data

[63] Continuation of Ser. No. 767,897, Sep. 30, 1991, abandoned.

[30] Foreign Application Priority Data

Oct. 1, 1990 [JP] Japan ................................ 2-263372

[51] Int. Cl.⁶ .................................................. G06F 11/00
[52] U.S. Cl. .............................. 395/182.11; 395/182.04
[58] Field of Search ............... 395/575, 9.1, 12, 395/13, 575, 182.04, 182.11; 371/12, 13, 9.1

[56] References Cited

U.S. PATENT DOCUMENTS

| | | | |
|---|---|---|---|
| 3,736,566 | 5/1973 | Anderson et al. | 340/172.5 |
| 4,697,266 | 9/1987 | Finley | 371/12 |
| 4,912,707 | 5/1990 | Kogge et al. | 371/12 |
| 4,930,128 | 5/1990 | Suzuki et al. | 371/12 |
| 5,214,652 | 5/1993 | Sutton | 371/9.1 |
| 5,327,551 | 7/1994 | Kaneko | 395/575 |

*Primary Examiner*—Robert W. Beausoliel, Jr.
*Assistant Examiner*—Norman M. Wright
*Attorney, Agent, or Firm*—Staas & Halsey

[57] ABSTRACT

A data restoring apparatus for saving data into second storage unit and for restoring the saved data back into the first storage unit after an abnormality occurs in a data processing system, whose program updates data comprising first data and second data stored in the first storage unit. The first data includes a plurality of data blocks and the second data specifies the relation between the data blocks. The present invention sets a checkpoint during execution of the program, saves a data block of the first data into the second storage unit when the data block is to be updated by the program, saves the second data into the second storage unit when the checkpoint is set, restores the first data and the second data, both saved in the second storage unit, into the first storage unit, and restarts the program from the checkpoint.

5 Claims, 6 Drawing Sheets

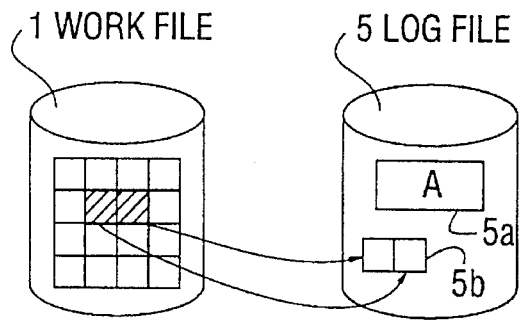
FIG. 6(a) COMMAND 66 EXECUTED
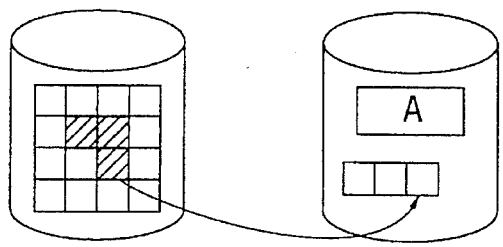
FIG. 6(b) COMMAND 67 EXECUTED
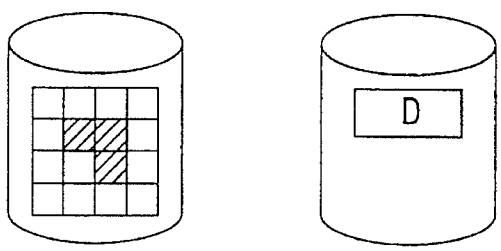
FIG. 6(c) CHECKPOINT ENCOUNTERED
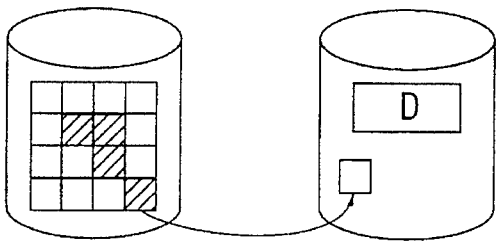
FIG. 6(d) COMMAND 68 EXECUTED
SYSTEM FAILURE OCCURS
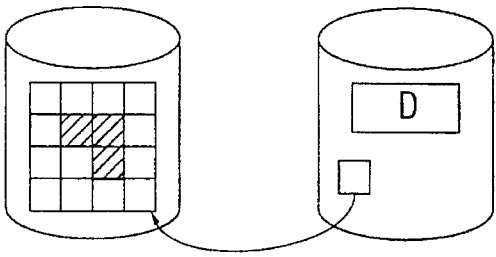
FIG. 6(e) DRAWING DATA RESTORED

DATA STORING APPARATUS AND METHOD FOR A DATA PROCESSING SYSTEM

This application is a continuation of application Ser. No. 07/767,897, filed Sep. 30, 1991, now abandoned.

BACKGROUND OF THE INVENTION

1. Field of the Invention

The present invention relates to a data restoring apparatus and method or more particularly to an apparatus and method for restoring data when an abnormality, such as a system failure, occurs in a data processing system due to for example a power failure, a power surge from a thunder storm, etc.

Recently, a data processing system, such as computer-aided design (CAD) system which deals with electronic circuit design and cartography, for example, is wide-spread or popular in a great variety of fields or professions. A CAD system, for example, performs large-scale and sophisticated data processing on an enormous volume of data. Therefore, if an abnormality occurs, the enormous volume of data must be restored properly. Currently, however, this restoration process requires much time. Accordingly, a data restoring apparatus which can properly and quickly restore data when an abnormality occurs, is in great demand.

2. Description of the Related Art

FIG. 1 shows a CAD system illustrating related art.

A main controller 4 performs a basic function for controlling the CAD system, for example. That is, the main controller 4 controls input/output (hereinafter abbreviated as I/O) units such as a keyboard, mouse, tablet, plotter and display unit. It performs such operations as drawing a picture (e.g., a dot and circle), duplicating and deleting data, and moving and rotating a picture. The main controller 4 also performs such backup processing as copying the geometry data edited by a sub-controller 3 into a log file 5. Since the CAD system involves an enormous volume of geometry data for expressing or configuring electronic circuitry, such as a map, etc., the sub-controller 3 is provided for exclusively controlling a work file 1 and a control table 2, to release or alleviate the main controller 4 from the heavy load of processing such an enormous volume of data. When a CAD system is aimed for mounting integrated circuits (ICs) and their connections on a printed wiring board, for example, the work file 1 stores geometry data, e.g., data expressing a top plan view of ICs. The control table 2 stores control data for specifying the relation of the geometry data items, e.g., data specifying a connection from one IC pin to another IC pin). This control data is much smaller in volume compared with the drawing or geometry data.

The CAD processing is started or initiated by loading initial geometry data and initial control data in the work file 1 and the control table 2, respectively, and is proceeded with sequentially executing a command which is a program specifying such operations as drawing a line between two designated points or changing a drawing. When a command is executed, geometry data in the work file 1 and/or control data in the control table 2 are updated as required.

When a system failure occurs during execution of a command, it is necessary to restore the geometry data and the control data properly, in order to restart the processing successfully. A log file 5 is provided, connected to the main controller 4, for this purpose.

A first category of related art restores geometry data and control data as follows:

Each time the geometry data in the work file 1 is to be updated as a result of executing a command, the data is saved in the log file 5 as backup data, before it is updated. When a system failure occurs in the process of executing a command, the geometry data is restored in the work file 1 by transferring the geometry data stored in log file 5 as backup data to the work file location. Then, the processing is restarted from the very beginning by using the thus-restored geometry data and the initial control data. However, a problem is that it usually takes quite a long time before restarting the processing interrupted by a system failure because all the commands, which were executed from the beginning until the system failure occurs, must be re-executed. This re-execution of commands requires much processing time.

A second category of related art reduces the number of commands to be re-executed and, therefore, the time the first related art takes for re-executing the commands is as follows:

A plurality of checkpoints are provided in the program (or between a group of commands). When a checkpoint is encountered in the process of executing the program, the control data at that point and all the geometry data in the work file 1, both of which data reflect the result of processing performed hitherto, are saved in the log file 5. Then, the program is resumed.

When a system failure occurs, the control data and all the geometry data is restored in the control table 2 and work file 1, respectively. Then, processing is restarted from the checkpoint. Thus, the time the first related art requires for re-executing commands can be reduced because only the commands, which were executed from the checkpoint until a system failure occurs, need be-re-executed. However, a problem in this case is that it takes quite a long time and the log file 5 requires a large storage capacity because all the large volume of geometry data need be saved and restored to and from the log file 5.

SUMMARY OF THE INVENTION

It is an object of the present invention to provide an efficient data restoring apparatus which can quickly restore data when an abnormality occurs in a data processing system.

It is another object of the present invention to provide an economic data restoring apparatus which can restore data with a small storage capacity of backup file when an abnormality occurs in a data processing system.

To achieve the above and other objects, the present invention sets a checkpoint during execution of a program and, when a data block of the first data is updated by the program, saves the data block into the second storage means before the data is updated. When the checkpoint occurs, it saves second data, which specifies the relation between the data blocks of the first data, into the second storage means. When an abnormality occurs, the present invention restores the first data and the second data, both saved in the second storage means, into the first storage means, and restarts the program from the checkpoint.

BRIEF DESCRIPTION OF THE DRAWINGS

FIGS. 6(a)–6(e) are diagrams illustrating the transitions of the contents of the work file 1 and log file 5.

Throughout the above-mentioned drawings, identical reference numerals are used to designate the same component parts.

DESCRIPTION OF THE PREFERRED EMBODIMENTS

Figure 1:
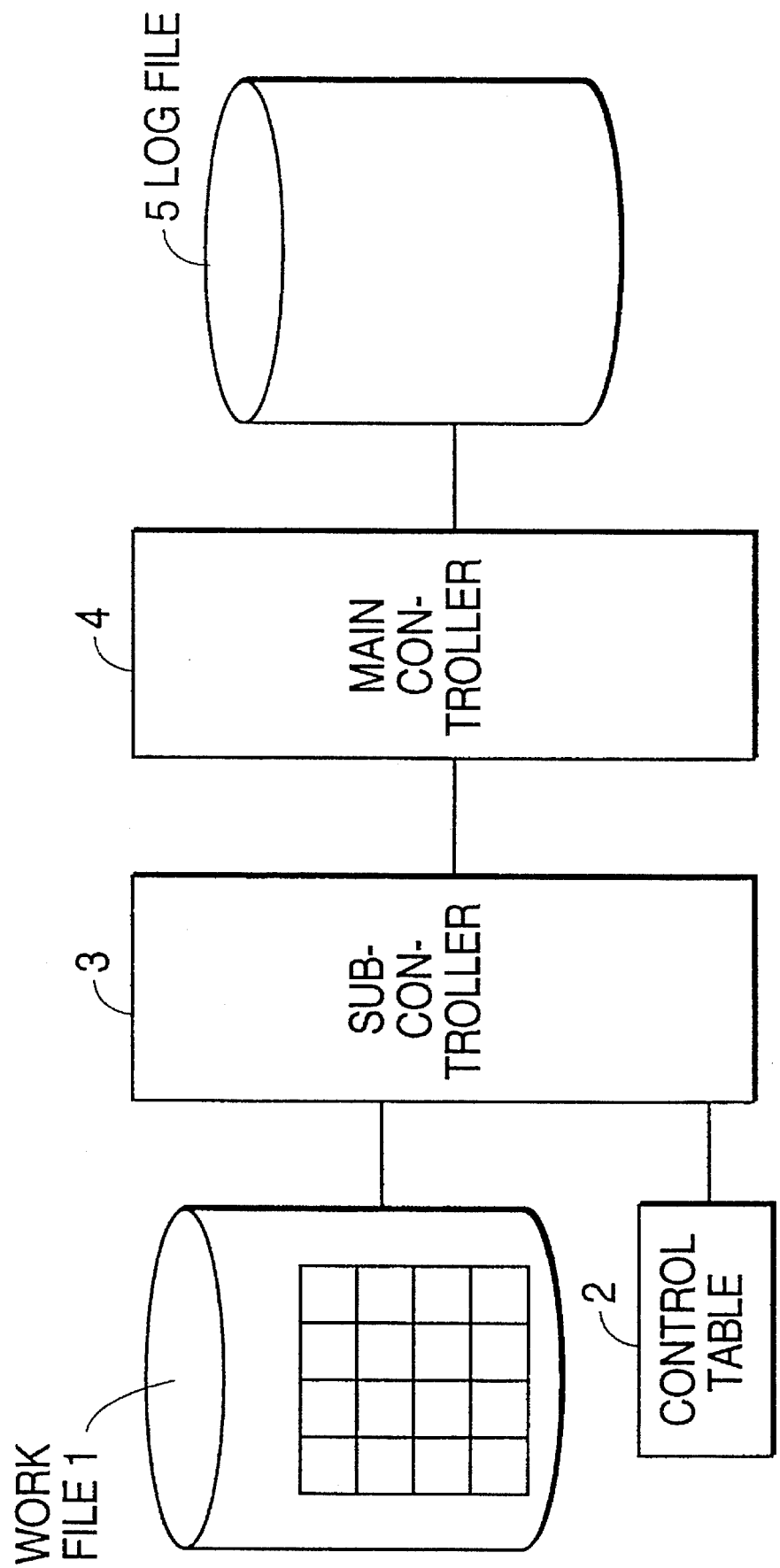
FIG. 1 shows a CAD system illustrating related art.
Figure 2:
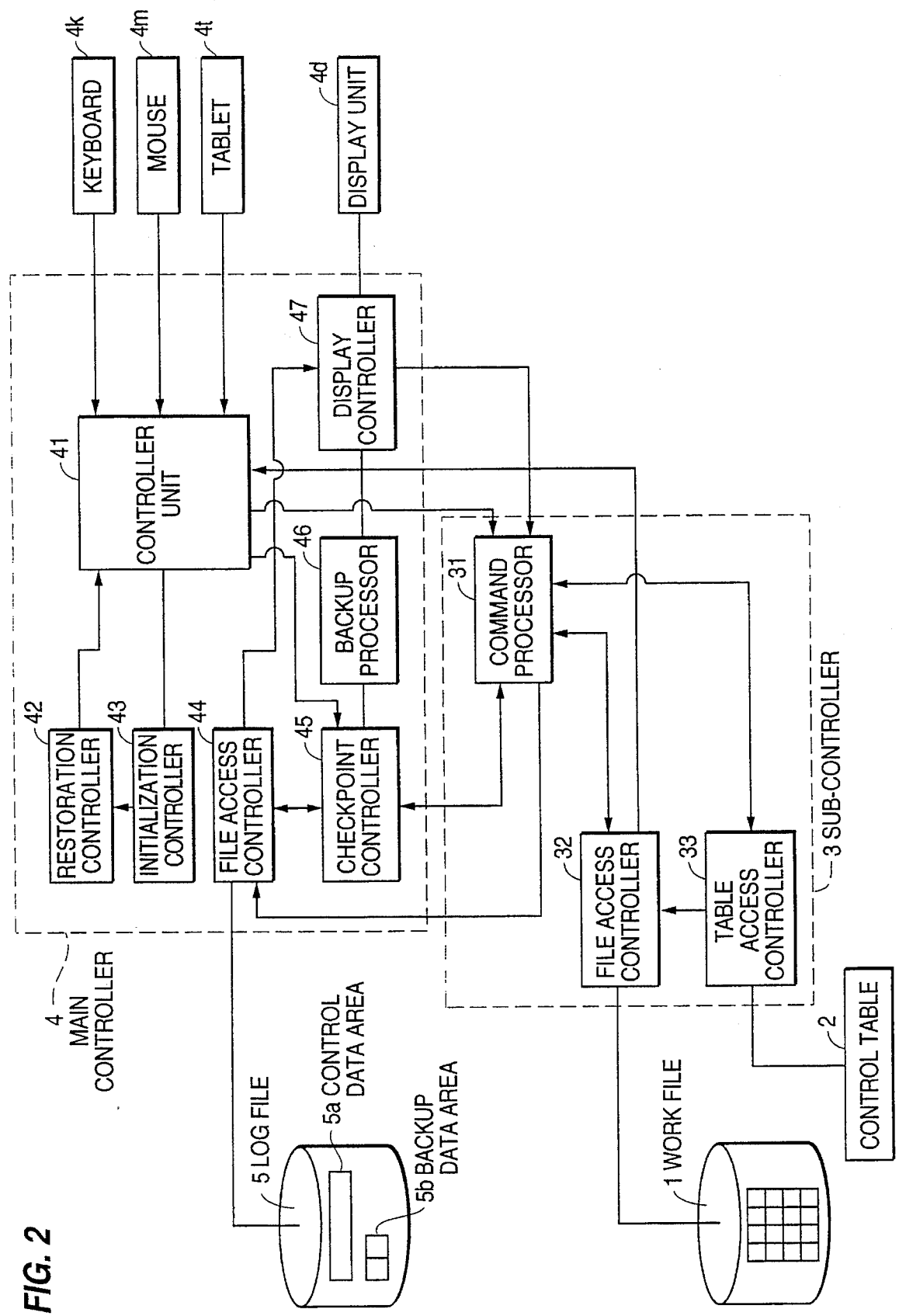
FIG. 2 is a block diagram of a CAD system illustrating the present invention.

FIG. 2 is a block diagram of a CAD system illustrating the present invention, thereafter, where the same element with the same function is used in FIG. 1, the same numbering is retained. The log file 5 of the embodiment of the present invention has a control data area 5a and a backup data area 5b for saving control data and geometry data blocks, respectively. The work file 1 is divided into areas (or pages) for storing data blocks, each page being stored with a geometry data block and the page address where the data block is stored. The component parts of FIG. 2 constituting the main controller 4 and sub-controller 3 are described with reference to FIGS. 3 and 4.

Figure 3:
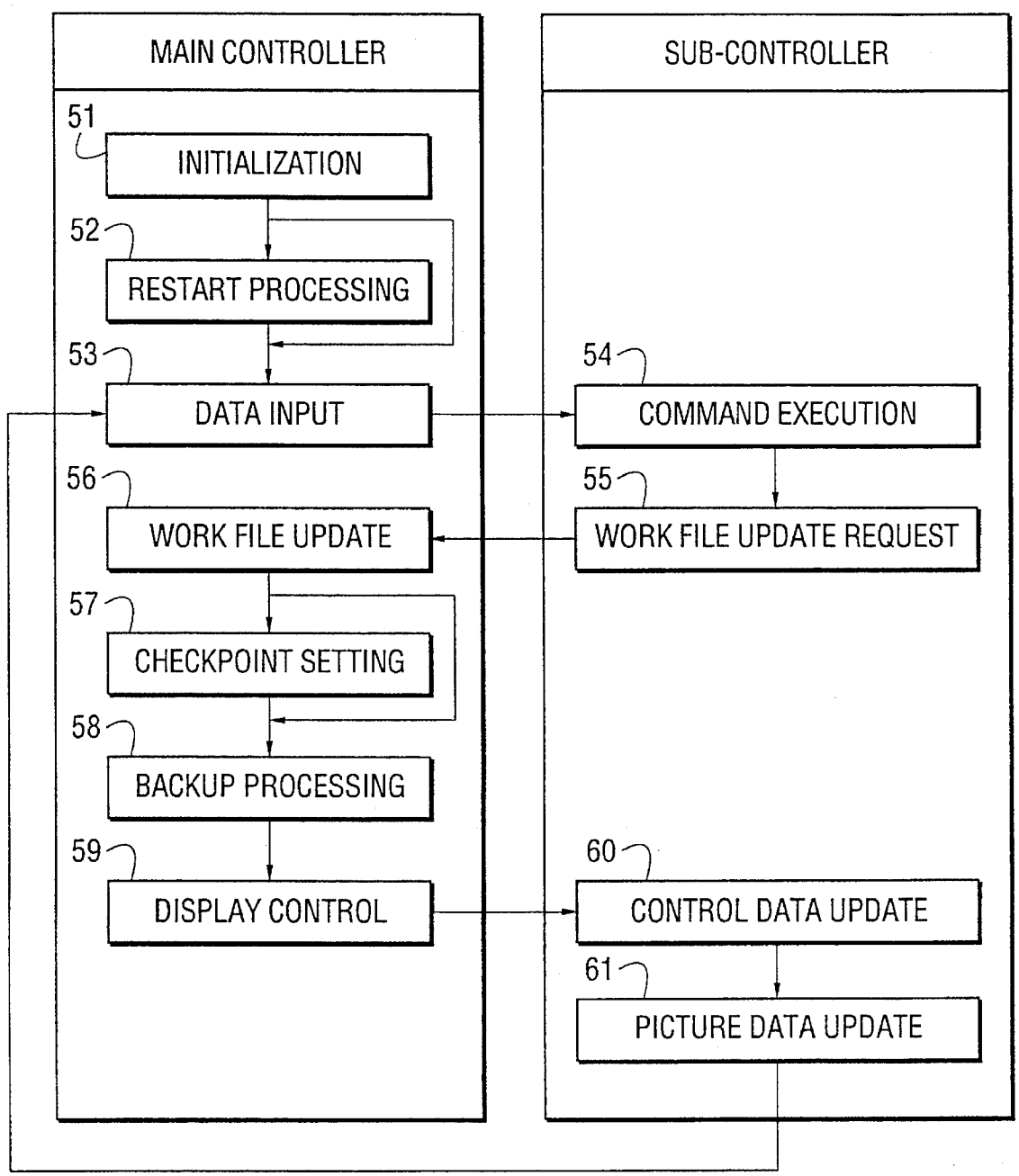
FIG. 3 is a flowchart illustrating the operations of a CAD system embodying the present invention.

FIG. 3 is a flowchart illustrating the operations of a CAD system embodying the present invention.

In FIG. 3, in the main controller 4, the initialization controller 43 performs a system initialization 51 and loads the CAD processing program, geometry data and control data into the work file 1 and into a main memory (not shown), respectively.

When the system is restarted 52 after a system failure, the restoration controller 42 controls the file access controller 44 to read the control data and the geometry data from the log file 5, and then writes the control data into the main memory. The restoration controller 42 also instructs the sub-controller 3 to restore the geometry data into the work file 1.

When data is input 53 from the keyboard 4k (or for examples, mouse 4m or tablet 4t), the input controller 41 sends the input data to the sub-control controller 3.

In the sub-controller 3, the command processor 31 creates and updates geometry data by executing a command 54 based on the data sent from the main controller 4.

When the geometry data is updated (changed or deleted), the command processor 31 sends the geometry data as it was before being updated 55 and requests the main controller 4 to update the work file 1, i.e., to save the geometry data not yet updated.

In the main controller 4, the file access controller 44 saves or updates 56 the geometry data sent into the backup data area 5b.

When detecting a checkpoint condition, the checkpoint controller 45 performs a checkpoint set operation 57 (explained later). The backup processor 46 controls the file access controller 44 to save the control data at this point into the control data area 5a of the log file 5.

The backup processor 46 also controls the file access controller 44 to save 58 the geometry data at this point into the backup data area 5b of the log file 5.

The display controller 47 displays 59 pictures and related data on the display unit 4d, as they are processed.

In the sub-controller 3, the command processor 31 activates the table access controller 33 to update 60 the control data in the control table 2 according to the result of executing the command.

The command processor 31 activates the file access controller 33 to update 61 the geometry data in the work file 1 according to the result of executing the command.

A checkpoint setting operation is performed through the following procedure.

Figure 4:
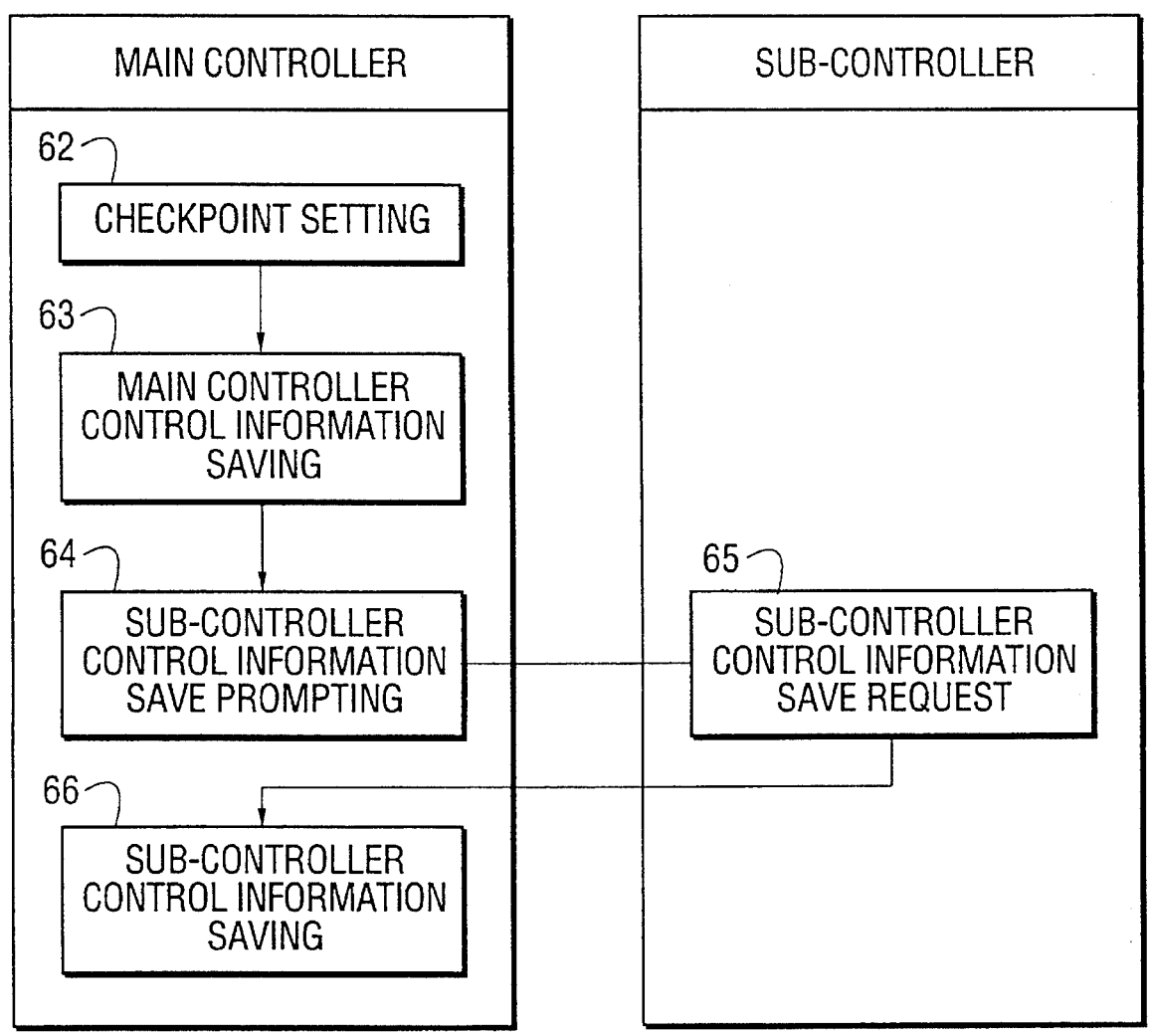
FIG. 4 is a flowchart illustrating a checkpoint setting.

In FIG. 4, which is a flowchart illustrating checkpoint setting,

In the main controller 4, the checkpoint controller 45 sets a checkpoint 62 when any of the following checkpoint set conditions is detected:

(a) An operator inputs a system command defined for generating a checkpoint, (b) A pre-designated time has elapsed, (c) A pre-designated amount of geometry data is saved in the log file 5, and (d) A pre-designated command is to be executed or has been executed. Conditions (c) and (d) are aimed for preventing the log file 5 from overflowing.

The checkpoint controller 45 activates the file access controller 44 which saves 63 the main controller control information currently being used, into the log file 5. The main controller control information, which is the data for controlling the system including input/output devices, is required to restore the system state when the system is restarted after a system failure.

The checkpoint controller 45 prompts 64 the command processor 31 to save the current sub-controller control information.

In the sub-controller 3, the command processor 31 sends 65 the current sub-controller control information to the main controller 4, in response to the prompt.

In the main controller 4, the file access controller 44 saves 66 the sub-controller control information sent into the log file 5.

Figure 5:
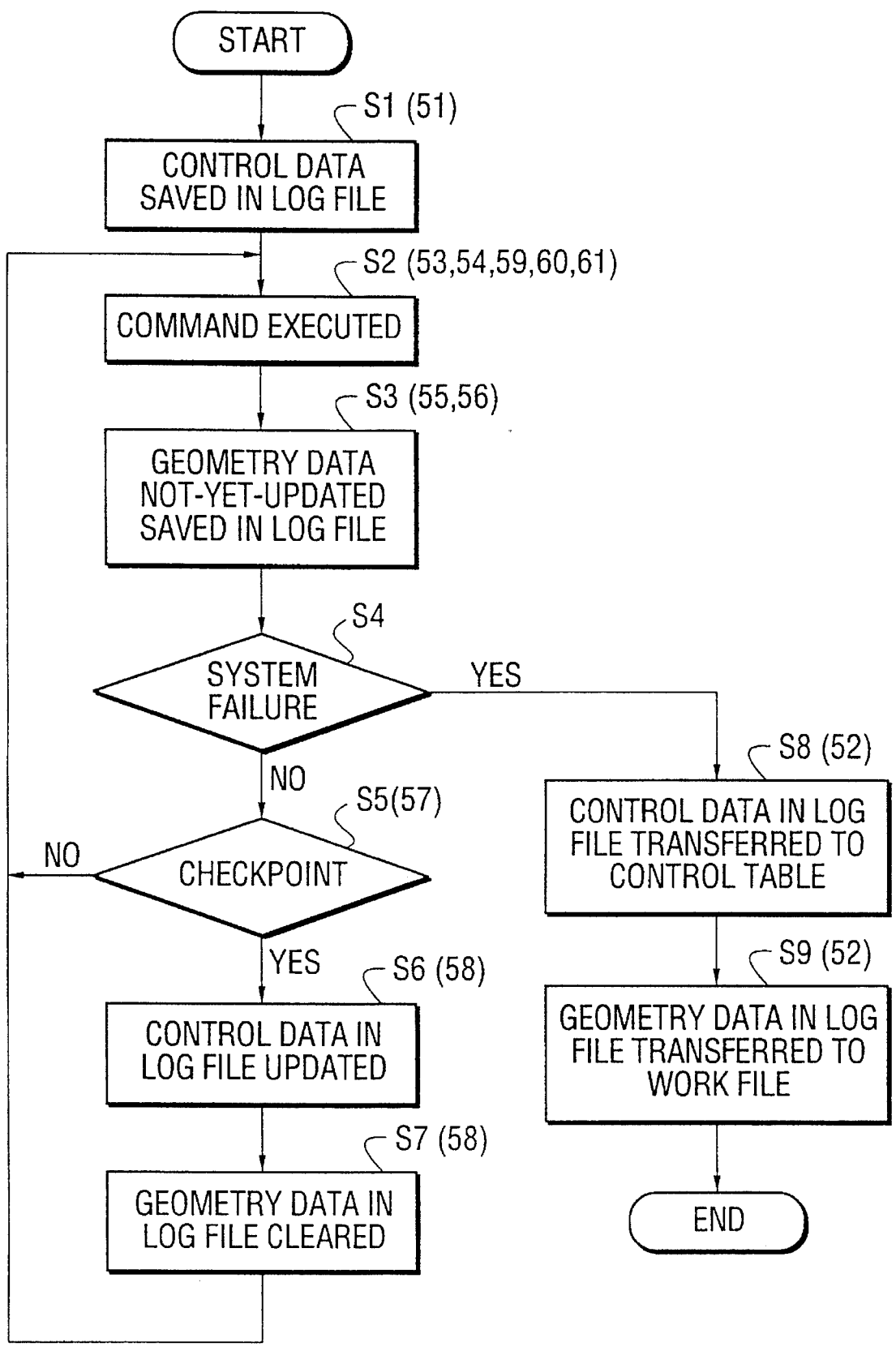
FIG. 5 is a flowchart illustrating the transitions of the contents of the work file 1 and log file 5.

FIG. 5 is a flowchart illustrating the transitions of the contents of the work file 1 and log file 5. FIGS. 6(a)–6(e) are diagrams illustrating the transitions of the contents of the work file 1 and log file 5.

A detailed explanation of how data is restored to restart the system is given with reference to FIG. 5 and FIGS. 6(a)–6(e). Numbers in parentheses written with the step number (S1)–(S9) in FIG. 5 correspond to those in FIG. 3.

The system is initialized in step S1 of FIG. 5 and control data (labeled as A in FIG. 6A) in the control table 2 is saved in the control data area 5a of the log file 5, prior to starting the program.

The program is then started in step S2 of FIG. 5. When data is input from the keyboard 4k, for example, a command 1 is executed.

When a geometry data block in the work file 1 is required to be updated as a result of executing the command 1, the data block is saved in the backup data area 5b of the log file 5 in step S3. After that, the geometry data block is updated in the work file 1.

The contents of the work file 1 and the log file 5 are shown in FIG. 6(a). That is, if a geometry data block (hatched in FIG. 6(a)) is to be updated as a result of executing the command 66, that geometry data block is first saved in the backup data area 5b and then updated in the work file 1.

As geometry data is updated, the control data in the control file 2 is updated accordingly (e.g., from A to B, C, ...), while the control data A saved in the log file 5, which is the value at the time when the processing is started, is maintained unchanged.

A check is made in step S4 to see if a system failure occurs.

Unless a system failure occurs, a check is made to see if a checkpoint set condition occurs in step S5. Unless a checkpoint set condition occurs, processing returns to step S2 to execute a following command 67. If a geometry data block in the work file 1 is required to be updated as a result of executing the command 67, the geometry data is saved in the log file 5 before it is updated, as shown in FIG. 6(b), with the control data A unchanged.

Steps S2–S5 are repeated as described above.

When a new checkpoint set condition occurs without a system failure occurring, a checkpoint is set. The control data A in the log file 5 is replaced by data D in step S6. Data D is the control data existing in the control table 2 at the time when the new checkpoint set condition occurs (see FIG. 6(c)).

The data to be restored to at the new checkpoint is the above-mentioned control data D and the geometry data existing in the work file 1 at this point. Accordingly, the geometry data which has been saved in the log file 5 is cleared in step 57 because it is now unnecessary for restoring the state of processing at the previous checkpoint or prior to the new checkpoint. Then, processing returns to step S2 to execute a command 68. Thus, when a geometry data block is to be updated as the processing progresses, the geometry data block not yet updated is saved in the log file 5 as shown in FIG. 6(d), with the control data D unchanged.

When a system failure occurs in the process of executing commands and the system recovers from the failure, the control data D in the log file 5 is restored in step S8 into the control table 2.

The geometry data blocks saved in the log file 5, each being a copy of the geometry data block, when a checkpoint was last set, are restored in step S9 into the page addresses of the work file 1 where they belonged or originated, as shown in FIG. 6(e). Accordingly, since the control data D and the geometry data blocks are restored into the control table 2 and the work file 1, respectively, as they were when the last checkpoint was set, the processing can be successfully restarted from the state of processing at the last-set checkpoint.

As is apparent from the above description, the present invention sets a checkpoint during execution of the program and makes it possible to restore the geometry data and the control data to the state at the time when the checkpoint is set. Thus, the present invention can reduce the number of commands to be re-executed when the processing is interrupted due to a system failure and, therefore, can reduce the time required to resume the processing. The present invention can also reduce a storage capacity of the log file 5.

What is claimed is:

1. A data restoring apparatus for saving data as saved data and for restoring the saved data after an abnormality occurs in a data processing system, the data processing system having a program which updates data comprising first data and second data stored respectively, in the first storage means and main storage, said first data including a plurality of data blocks and said second data specifying a relation between the plurality of data blocks, said data restoring apparatus comprising:

checkpoint setting means for setting a checkpoint by the program during execution of the program;

first saving means for saving at least one of said plurality of data blocks included in the first data into second storage means before the one of said plurality of data blocks is updated by the program;

second saving means for saving the second data stored in the main storage into the second storage means when the checkpoint is set;

restoring means for restoring the first data and the second data saved in the second storage means, into the first storage means and the main storage; and means for restarting the program from said checkpoint.

2. A data restoring apparatus according to claim 1, wherein each of said plurality of data blocks of said first data includes address data indicating a location of the first storage means where each of the plurality of data blocks is stored and said restoring means restores the one of said plurality of data blocks saved in the second storage means into the first storage means using said address data.

3. A data restoring method of saving data as saved data and for restoring the saved data after an abnormality occurs in a data processing system, the data processing system having a program which updates data comprising first data and second data stored respectively, in the first storage means and main storage, said first data including a plurality of data blocks and said second data specifying a relation between the plurality of data blocks, said data restoring method comprising the steps of:

setting a checkpoint during execution of the program;

saving at least one of said plurality of data blocks included in the first data into second storage means before the one of said plurality of data blocks is updated by the program;

saving the second data stored in the main storage into the second storage means when the checkpoint is set;

restoring the first data and the second data saved in the second storage means, into the first storage means and the main storage; and restarting the program from said checkpoint.

4. A data restoring method according to claim 3, further comprising the steps of:

providing each of said plurality of data blocks of said first data with address data indicating a location of the first storage means where each of the plurality of data blocks is stored; and restoring the one of said plurality of data blocks saved in the second storage means into the first storage means using said address data.

5. A data restoring apparatus for restoring data to a first external storage device in a data processing system, the data processing system having a program which updates data including first data and second data stored respectively in the first external storage device and main storage, the first data including data blocks and the second data specifying a relation among the data blocks, said data restoring apparatus comprising:

checkpoint setting means for setting a checkpoint during execution of the programs;

first saving means for saving at least one of said data blocks into a second external storage device before the one data block is updated by the program;

second saving means for saving the second data into the second external storage device when the checkpoint is set; and restoring means for restoring the first data and the second data saved in the second external storage device, into the first external storage device and the main storage.

* * * * *

UNITED STATES PATENT AND TRADEMARK OFFICE
CERTIFICATE OF CORRECTION

PATENT NO. : 5,530,801
DATED : June 25, 1996
INVENTOR(S) : Nobuo KOBAYASHI

It is certified that error appears in the above-indentified patent and that said Letters Patent is hereby corrected as shown below:

Col. 3, line 43, delete "control".

Signed and Sealed this

Tenth Day of September, 1996

Attest:

BRUCE LEHMAN

Attesting Officer

Commissioner of Patents and Trademarks